Feb. 17, 1931.    J. H. LEHMAN    1,792,991
LUBRICATION OF ROTARY VALVES
Filed Dec. 14, 1927
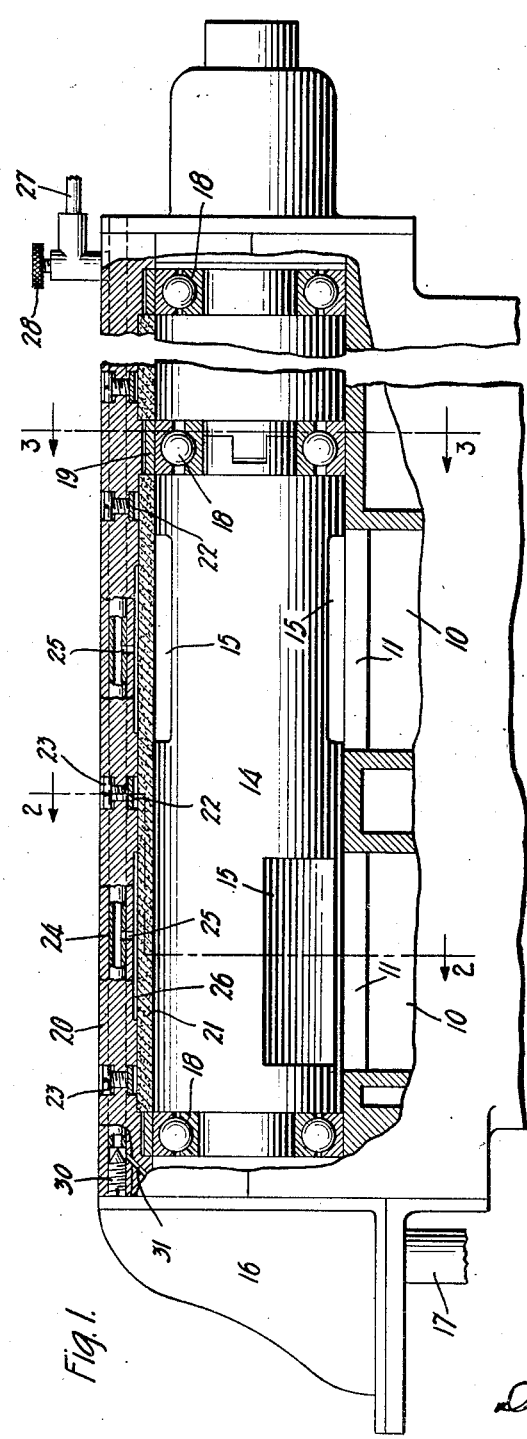
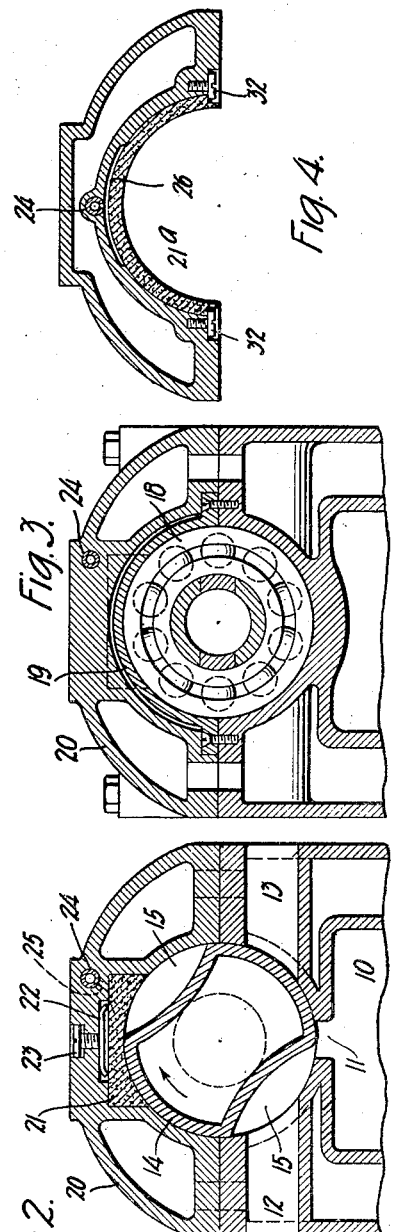
INVENTOR
Joseph H Lehman
BY
Dean Fairbank Albright & Hirsch
ATTORNEYS Patented Feb. 17, 1931

1,792,991

UNITED STATES PATENT OFFICE

JOSEPH H. LEHMAN, OF HASBROUCK HEIGHTS, NEW JERSEY, ASSIGNOR TO LEHMAN ROTARY VALVE CO., INC., OF NEW YORK, N. Y., A CORPORATION OF NEW YORK

LUBRICATION OF ROTARY VALVES

Application filed December 14, 1927. Serial No. 239,841.

This invention is an improvement in internal combustion engines of the rotary valve type and relates more particularly to the means employed for lubrication of the valve.

The utilization of a rotary valve for controlling the delivery of motive fluid and exhaust gas from an internal combustion engine involves certain problems which have presented great difficulties. One of these is the maintenance of the proper close fit of the valve under widely varying temperature, pressure and speed conditions, and the other is the proper lubrication of the valve under these varying conditions.

Portions of the surface of the valve are exposed to the very high temperature existing in the cylinder at the instant of the explosion and the pockets, passages or by-passes in the valve lie in the path of movement of the out-rushing hot exhaust gas and the in-going comparatively cool charge. So far as I am aware all previous attempts to deliver an adequate supply of oil to the working surfaces and properly distribute it under high temperature conditions has resulted in portions of said oil coming in contact with the hot out-going exhaust gases and the vaporizing or partial burning of said oil whereby more or less smoke is produced in the exhaust. This is particularly undesirable if the engine be employed for driving an automobile and in any event involves a waste of oil.

The main object of the present invention is to provide adequate lubrication of the valve under the varying conditions of use and by means of such an arrangement of parts that smoking will be reduced to a minimum, if not entirely eliminated.

In carrying out my invention I provide a block of hard material in contact with the valve surface and having minute pores or passages therethrough. This is so mounted that it is not in the path of the outgoing exhaust gas or the incoming charge so that oil is not forced back into the block or sucked out by gas pressure, nor is it swept off the surface by such gas flow. The block is mounted so that the action of gravity tends to carry the oil from the source of oil supply to the working surface. Thus the oil may slowly seep through to the surface of said block which is exposed to direct contact with the rotating valve body and this surface may be kept covered with a comparatively thin, but adequate film of oil. There will be no flow or dropping of oil into the pockets or by-passes of the valve or the valve casing. The material employed is of such a character that it will not burn or be otherwise injuriously affected by the temperature of the valve body, and the pores through the material are such that the body will be impregnated with oil, but the pores offer a comparatively high resistance to any flow of the oil through the block faster than the valve requires. Thus the oil may be delivered to and enter the outer surface of the block at the low rate at which it is used up on the inner surface and it will be distributed through the material and over a wide portion of the surface of the valve.

As the block is so mounted that oil cannot reach the surface of the valve without passing through the block, the thickness of the block, the porosity, and the oil pressure control the rate of oil delivery. Preferably the block of material is so mounted that it does not serve to resist movement of the valve or hold the valve in position. It is merely mounted so that it contacts with, or has a close fit on the valve surface. Although the block does not necessarily extend along the full length of the valve it overlaps a section of greater length than the passages of the valve or the ports controlling by the valve and oils the valve along all or substantially all of its length.

As examples of the material which I may employ I may mention coked carbon, graphitic carbon, "genelatite" or other metal-graphite composition, highly compressed comminuted metal or other such porous material.

In the accompanying drawings I have illustrated certain embodiments of my invention, but it will, of course, be understood that various changes may be made in the construction and arrangement of the parts without departing from the spirit of my invention.

In these drawings:

Fig. 1 is a central longitudinal section through a portion of a cylinder head provided with a rotary valve and lubricating means therefor;

Figs. 2 and 3 are transverse sections on the lines 2—2 and 3—3 respectively of Fig. 1; and Fig. 4 is a section similar to the upper portion of Fig. 2, but showing a different form of lubricating means.

I have illustrated my invention as applied to an engine having a plurality of cylinders 10, each with a port 11 in one wall thereof. In the cylinder head or wall is a valve casing having a bore for the valve and with which the port 11 communicates. Upon opposite sides of the cylinder port 11 the valve casing or bore has inlet and exhaust ports 12 and 13 and in the valve casing is a rotary valve 14 for connecting the cylinder port 11 with the inlet and exhaust ports in succession. The valve is of hollow cylindrical type with pockets or by-passes 15 in the periphery thereof. By providing diametrically opposite pockets for each cylinder the valve will be driven at one-quarter the speed of the crank shaft, but obviously with the proper proportioning of the parts a larger or smaller number of pockets might be used with corresponding slower or faster rotation. The driving means may be of any suitable character mounted in a gear housing 16 at one end of the valve and a drive shaft 17 or other power transmission means may deliver power from the crank shaft.

As my present invention does not relate to the driving or cooling of the valve or the means permitting axial expansion, I have not illustrated the parts for these purposes, but it will, of course, be understood that suitable parts would be provided.

In order to hold the valve in close running contact with the valve seat, that is, the lower surface of the valve bore upon opposite sides of the cylinder port 11, the valve is preferably provided with a plurality of ball bearings 18 mounted on portions of the valve of reduced diameter so that the exterior of the outer race rings of the ball bearings are very slightly larger than the valve body. Thus when the race rings are clamped down against the lower or inner half of the valve bore, the surface of the valve will not be tightly clamped against said surface, but will have light contact or very slight clearance.

For resisting upward movement of the race rings there are provided straps 19 of substantially semi-cylindrical form and extending along the upper half of each ball bearing. The ends of each strap are clamped down to the lower half of the valve casing so as to rigidly secure the ball bearings against any upward movement and to thus prevent movement of the valve away from the cylinder ports under varying temperature and pressure conditions. The straps are made of a metal or alloy having such a coefficient of expansion under temperature change that as the valve becomes heated the straps will permit the expansion of the valve upwardly without disturbing the clearance or close running fit of the valve with the seat adjacent to the cylinder ports. For such straps I may employ a bronze, commonly known as navy bronze, and I make the straps of such thickness that although they expand with heat they resist any expansion or stretching by the action of the high pressure exerted against the valve at the time of explosion in the cylinder.

The bore in which the valve is mounted may be very slightly elliptical so that when the valve is cold it will properly contact at the upper and lower sides of the bore, but will be free at points disposed 90° from the cylinder port.

As the valve becomes heated and expands uniformly and as the straps elongate under increase in temperature, the valve will remain in the same relationship to the valve port, and some of the clearance at the intermediate or lateral faces may be taken up without binding or siezing.

The valve is preferably made in sections, each, for instance, of a length to control two cylinders, and ball bearings with their corresponding straps may be employed between adjacent sections as well as at opposite ends of the valve body.

As the important feature of my present invention, I provide the upper or outer section of the valve casing 20 with improved means for delivering lubricant at the proper rate to the surface of the valve so as to prevent the accumulation of oil in the pockets 15 and to prevent the engine from smoking. The upper section of the valve casing is provided with a block 21 of porous material, such for instance as graphitic carbon, coked carbon, a pressed and fused mixture of metal and graphite, a block of hard pressed finely comminuted metal or the like. The block is of slightly porous nature and sufficient hardness and rigidity to insure the retention of the predetermined form which has been effected by cutting or moulding operation. This block 21 is shown in Figs. 1 and 2 as of such width that it extends along the surface of the valve through an arc slightly greater than the width of one of the pockets 15 and of a length equal to the distance between successive ball bearing retaining straps. The block is shown as having parallel side walls so that it may be forced with a tight fit into a chamber or cavity of the proper size, in the upper half of the valve casing. The inner side is curved to substantially conform to the surface of the valve, while the upper surface or top may correspond to that of the chamber in which it is mounted. The side edges of the block may have a press fit in the chamber so as to prevent any leakage of oil along them or they may be sealed by the use of suitable cement. Preferably the block does not have any appreciable movement under varying conditions of use, but if desired, there may be provided comparatively stiff leaf springs 22 held down by set screws 23 so as to exert a slight inward pressure of the block on the valve.

The valve casing is provided with a lubricant delivery pipe 24 which is shown as a piece of tubing cast in place to thus insure accurate positioning and to avoid expense and difficulty in drilling the hole the length of the casing. Thus tube has branch passages 25 leading to the upper surface of the porous block 21 and at the inner end of each branch passage 25 there are preferably radially disposed grooves 26 forming a small oil chamber whereby the oil may distribute itself along a considerable portion of the length of the block. The oil is delivered to the tube 24 under pressure which may be varied according to the thickness of the block and the porosity thereof. When using a coked carbon block the pressure may be from 5 to 15 points per square inch. The oil is delivered through a pipe 27 which may have a needle valve 28 whereby the pressure in the tube 24 may be lowered from that produced by the oil pump or employed in the other parts of the engine lubricating system. The pipe 27 may lead directly from the pump or from the lubricating system at any point in the latter where the oil is under a pressure at least as high as that desired for the tube 24. The surplus oil from the tube 24 is returned to the crank case or other source of supply and an obstruction is provided at the outlet of the tube 24 whereby the desired pressure is maintained in the tube. As shown there is an adjustable needle valve 30 at the outlet of the tube controlling a passage 31 leading to the gear casing 16 where the gears are lubricated and the excess of oil passes down to the crank case, along the casing enclosing the shaft 17 or other valve driving means. This valve may be set to maintain the desired pressure in the tube when the engine is running.

The porous block 21 serves as a reservoir to store a small amount of oil when the engine is cold and this oil almost immediately begins to exude on the inner side of the block as the block and valve warm up when the engine is started. In operation the oil distributes itself from the passages 26 through the block, so as to maintain a very thin film of oil on the inner surface of the block. The rate of delivery of the oil is very low, but the distribution is over a comparatively large area so that efficient lubrication is effected. Even when the valve is removed and the oil is delivered to the tube 24 under pressure it will pass to the inner surface of the porous block only at a very low rate and will appear as a mere wetting of the surface or as very slight sweating.

By supporting the valve on ball bearings so that the porous block does not have to serve the purpose of holding the valve in place, a substantially uniform pressure or clearance of the valve and porous block may be maintained, and the lubrication effected by the very slow exuding of the oil from the block, is amply sufficient to provide the necessary lubrication, but it does not permit any oil to flow into the pockets of the valve when said pockets are opposite the passages 25 and 26.

As the thin film of oil is delivered to the cylindrical surface of the valve and none passes into the pockets, there is practically none to be burned off or swept out by the hot exhaust gases and the engine does not smoke.

As the block is diametrically opposite to the cylinder port, the oil is properly supplied to and distributed over the surface before it reaches the valve seat, that is the portions of the bore on opposite sides of the cylinder port 11, where it is necessary to maintain the closest fit and a tight seal to prevent leakage of gas when the cylinder pressure is highest. Some of the oil exudes at the ends of the block to work its way into the ball bearings so that no direct lubrication of the latter is necessary. The rear edge of each pocket 15 is slightly rounded. Thus it does not act as a scraper to force oil into the pocket. On the contrary the rounded edge may roll oil along the surface of the block and insure wider distribution.

In Fig. 4 the construction is similar to that above described except that the carbon block 21a extends along the substantially 180° forming the upper half of the valve surface and is held in place by screws 32. To prevent oil from working along the outer surface of the block and escaping to the valve bore at the edges of the block, I preferably apply a suitable sealing or cementing material along all of the free edges of the block. In this construction I do not employ or need any spring such as the spring 22 shown in Figs. 1 and 2. This holds the oil under the desired pressure and forces it to exude from a considerable amount of the inner surface of the block.

Various other arrangements might be employed, for instance, if the valve is held down to its seat by a spring pressed or other movable member, this may be lined with the porous material and the oil delivered through said member, preferably, although not necessarily, under pressure.

Having thus described my invention, what I claim as new and desire to secure by Letters Patent is:

1. An internal combustion engine having a valve casing provided with a substantially cylindrical bore, a port communicating with the engine cylinder, and separate inlet and exhaust ports, a cylindrical rotary valve within said bore for controlling said first mentioned port and having a by-pass in the periphery thereof forming inlet and exhaust passages for intermittently connecting said ports, a block of hard slightly porous material in said casing spaced from said ports and out of the path of gases passing through said ports and having an inner surface substantially conforming to a portion of the surface of said valve and of a length greater than the length of said by-pass axially of said valve, and means for delivering lubricant to the outer surface of said block whereby it may seep through the pores of said block to the surface of said valve.

2. An internal combustion engine having a valve casing provided with a substantially cylindrical bore, a port communicating with the engine cylinder, and separate inlet and exhaust ports, a cylindrical rotary valve within said bore for controlling said first mentioned port and having a by-pass in the periphery thereof forming a gas passage for intermittently connecting said ports, a block of hard slightly porous material in said casing spaced from said ports and out of the path of the gases passing through said ports and having an inner surface substantially conforming to a portion of the surface of said valve and of a width greater than the width of said by-pass circumferentially of said valve, and means for delivering lubricant to the outer surface of said block whereby it may seep through the pores of said block to the surface of said valve.

Signed at New York, in the county of New York and State of New York, this 12th day of December, A. D. 1927.

JOSEPH H. LEHMAN.